Patented Feb. 13, 1940

2,189,793

UNITED STATES PATENT OFFICE 2,189,793

PRODUCTION OF GLYCERIN BY FERMENTATION

Hugo Haehn, Finkenkrug, near Berlin, Germany

No Drawing. Application October 27, 1937, Serial No. 171,343. In Germany October 31, 1936

2 Claims. (Cl. 195—38)

The formation of glycerin by fermentation of sugars with yeast (top-fermentation culture-press yeast) is a process which has long been known. It is also known in the art that the output of glycerin can be considerably increased by the addition of certain steering substances to the fermenting materials, the fermentation process being in other words led in the direction of glycerin fermentation. Various salts such as phosphates, carbonates and sulphites in various concentrations have been successfully used as the addition. It has at the same time been found that with increased addition of salt the yield increases; but against this the time of fermentation in this case is considerably increased.

Owing to the relatively small yield of glycerin and owing to the long time of fermentation, processes for the production of glycerin by fermentation have hitherto had considerable drawbacks. In addition to the long time of fermentation and the poor actual yield of glycerin as compared with the theoretical yield, the further drawback which has proved of paramount importance as regards the economic practice of the glycerin fermenting process in question, has been encountered that the yeast in general only permitted a single fermentation to be carried out and that repeated use without further measures was practically impossible.

It has now been found that the above difficulties can be overcome if the energy supply system of the yeast is widened by providing for energetic respirations in addition to the fermentation.

The conditions are as follows:

In normal alcoholic fermentation, the sugar is practically quantitatively split up into alcohol and carbon dioxide, the highest possible fermentation energy being thereby put at the disposal of the yeast.

In "glycerin fermentation" the normal functioning of the yeast is hindered by the considerable addition of salt, which leads to degeneration phenomena and lower fermentation yields.

The disadvantages can be avoided if provision is made for energetic respiration of the yeast by the addition of air practically during the whole glycerin fermentation process; so much energy is thereby supplied to the yeast that the damage is compensated and the yeast remains continuously in a healthy condition. This results in an increased yield of glycerin, a more rapid fermentation and the possibility of a repeated use of the same pitching yeast. During the aeration, the oxidation can additionally be furthered by small additions for example of manganese or iron salts, which in themselves are known as oxidation catalysts for accelerating fermentation processes and for increasing the yield.

A feature which is of primary importance in the present process is that the aeration is carried out practically during the whole of the fermentation, because only thereby is the energetic respiration of the yeast which is aimed at and necessary, achieved.

In the production of glycerin by fermentation in processes which work with quite small quantities of free sulphurous acid, in the past small quantities of air have been added quite at the end of the fermentation, air being blown in in a coarse fashion or the practically fully fermented liquid being poured out; the purpose of this treatment was to hinder conversion of residues of sulphurous acid into hydrogen sulphide by the reductases of the yeast.

The above described effects and technical advantages are not achieved by this weak aeration right at the end of the fermentation, for the coarse and limited addition of air right at the end of the fermentation does not suffice to compensate the harm to the yeast and the resulting changed conditions of life occasioned by the addition of steering substances in "glycerin fermentation" and to further respiration to the degree which is achieved by aeration during the whole period of fermentation and which is necessary to attain the desired effects.

Fine aeration practically during the whole period of fermentation has been found particularly desirable, because particularly intensive encouragement of respiration is thereby obtained; methods and apparatus for fine aeration of fermenting liquids such as those of Stich, (see for example Patents Nos. 1,792,450 and 1,959,554), and so forth are in themselves so well known in the art that no further description is necessary here. The term "fine aeration" used in the claims is to be understood in this sense.

Example I

To a fermenting batch of 100 gms. of sugar, 2 gms. of ammonium phosphate, 1 gm. of magnesium sulphate and 10 gms. of top fermentation yeast race M of the Institut für Garungsgewerbe, Berlin, in 1 liter of water, 50 gms. of sodium sulphite are added in portions. Air is supplied by an aeration candle (porous ceramic body), the reaction mixture tested from hour to hour for sulphurous acid and the hydrogen ion concentration held constant within certain limits. If the reaction proceeds towards the neutral, correction must be effected by the addition of alkali. Considerable variations often occur in the individual hours. With this method after about 8 hours the sugar is used up and the glycerin can be recovered from the fermented liquid in manner known per se. In the process according to the invention the yeast shows a fairly good increase and the separated yeast is in good physiological condition so that it can be used straight away for the next fermentation.

The yield of glycerin amounts to 25–30% calculated on the sugar used.

In a test fermentation carried out without addition of air, the fermentation was finished after 72 hours and the yeast was in such a bad physiological condition that direct further use for the next fermentation was impossible; the yield of glycerin amounted to 19%.

Thus in the process according to the invention, along with an increased yield and the recovery of reusable yeast, the fermentation proceeds about nine times as fast as in the old process.

Mould yeast and especially the genera Mycoderma, Pichia, Willia and Torula have been found particularly suitable for "glycerin fermentation."

*Example II*

100 gms. of sugar (cane sugar or corresponding quantities of molasses or wood sugar) are dissolved in 600 c. c. of water and 2 gms. of ammonium phosphate and 1 gm. of magnesium sulphate added. After addition of 10 gms. of mould yeast (Mycoderma No. 12 of the Institut für Garungsgewerbe, Berlin) provision is made for abundant air supply, air being allowed to enter at the bottom of the vessel in finely divided form. 50 gms. of anhydrous sulphite dissolved in 400 c. c. of water are now added continuously over a period of 20 hours. After 23 hours fermentation at 34° C. the sugar is used up, whereupon the glycerin can be recovered in known manner. Yield, 30–34 gms. glycerin calculated on the sugar used.

It is clear that the yield of glycerin is increased as compared with the use of top fermentation yeast race M according to Example 1. This yeast also is in good physiological condition so that its direct further use for the next fermentation is possible.

The new process is advantageous for every glycerin fermentation process in which a weakening of the micro-organism in its life-functions occurs through the addition of steering substances.

What I claim is:

1. In the process of producing glycerin by fermentation of sugar by means of a yeast selected from the genera consisting of top fermentation culture-press yeast, Mycoderma, Pichia, Willia, and Torula, in the presence of steering substances which produce an increased yield of glycerin in the fermentation, the step which consists in effecting aeration practically during the whole period of fermentation in such a manner as to provide for energetic respiration of the yeast.

2. In the process of producing glycerin by fermentation of sugar by means of a yeast selected from the genera consisting of top fermentation culture-press yeast, Mycoderma, Pichia, Willia, and Torula, in the presence of steering substances which produce an increased yield of glycerin in the fermentation, the step which consists in effecting fine aeration practically during the whole period of fermentation in such a manner as to provide for energetic respiration of the yeast.

HUGO HAEHN.